E. BASEMAN.
MANURE SPREADER.
APPLICATION FILED JAN. 23, 1915.
1,278,091.
Patented Sept. 10, 1918.
2 SHEETS—SHEET 1.
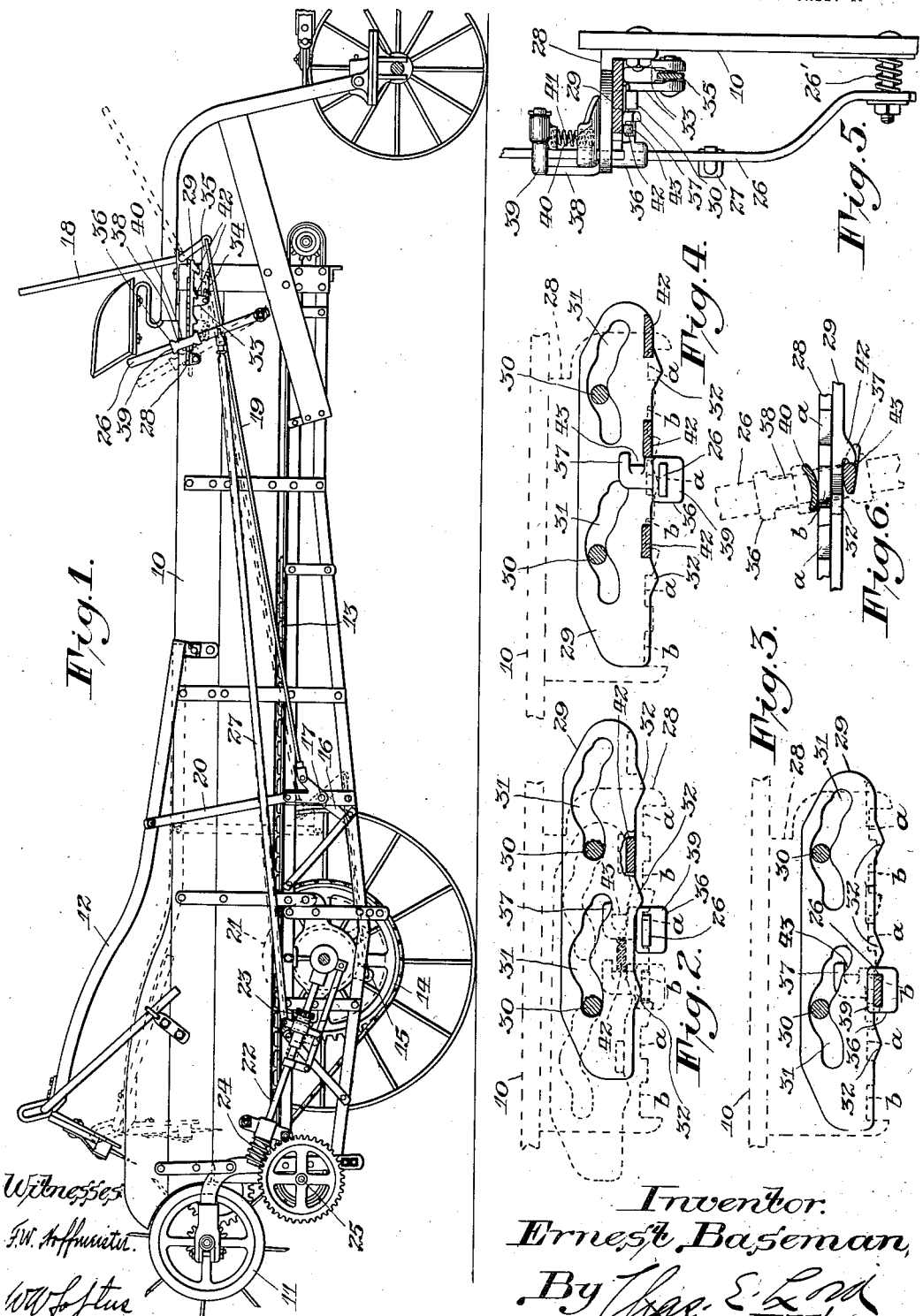

E. BASEMAN.
MANURE SPREADER.
APPLICATION FILED JAN. 23, 1915.
1,278,091.
Patented Sept. 10, 1918.
2 SHEETS—SHEET 2.
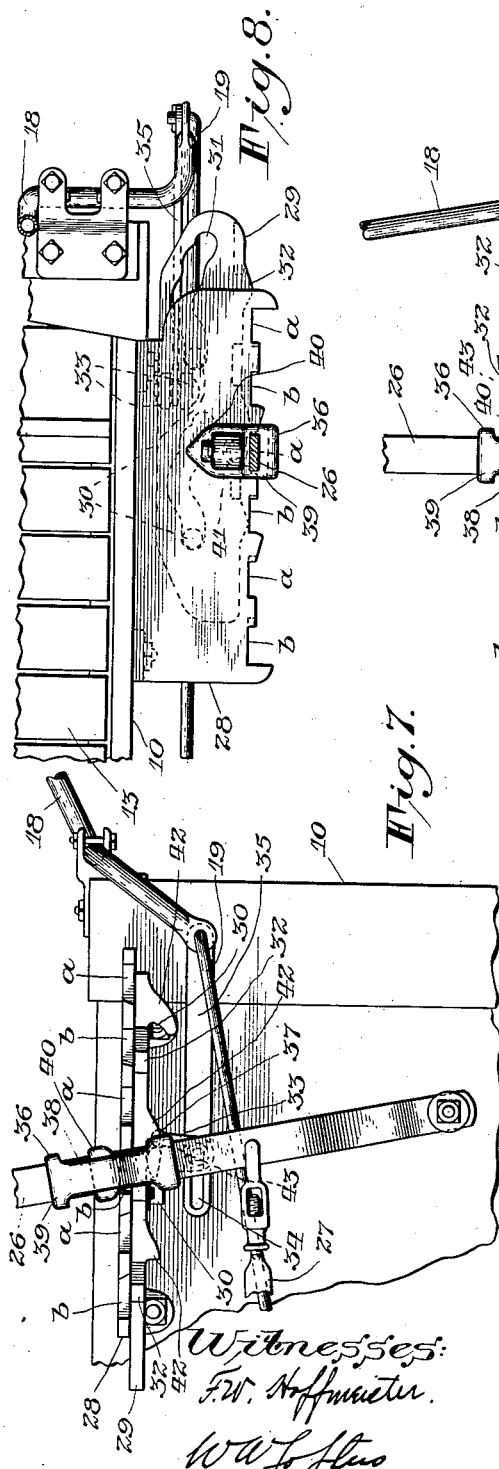
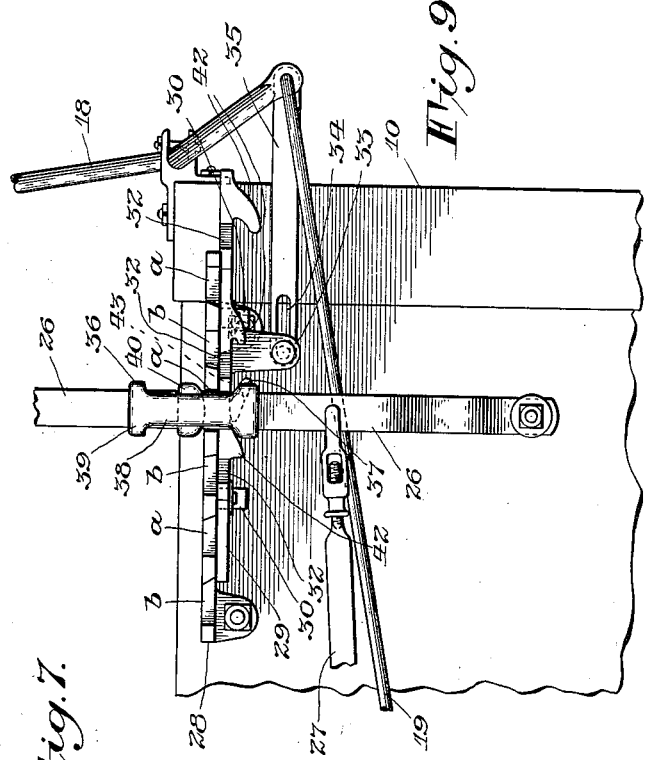
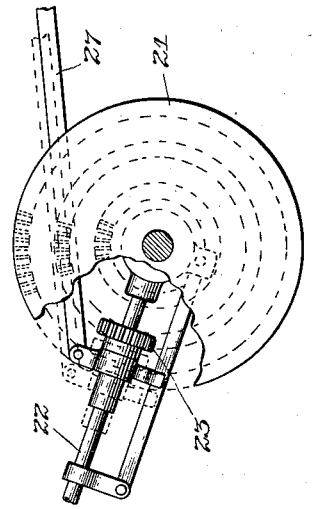
Inventor:
Ernest Baseman

UNITED STATES PATENT OFFICE.

ERNEST BASEMAN, OF HAMILTON, ONTARIO, CANADA, ASSIGNOR, BY MESNE ASSIGNMENTS, TO INTERNATIONAL HARVESTER CORPORATION, A CORPORATION OF NEW JERSEY.

MANURE-SPREADER.

1,278,091.  Specification of Letters Patent.  Patented Sept. 10, 1918.

Application filed January 23, 1915. Serial No. 3,936.

*To all whom it may concern:*

Be it known that I, ERNEST BASEMAN, a citizen of the United States, residing at Hamilton, in the county of Wentworth and Province of Ontario, Dominion of Canada, have invented certain new and useful Improvements in Manure-Spreaders, of which the following is a full, clear, and exact specification.

This invention relates to manure spreaders, and has for its object to simplify and improve the construction and operation of such devices with the particular view of minimizing the possibility of breakage and disarrangement of the operative parts thereof.

In gear-driven manure spreaders now in general use two levers are provided for controlling the parts, one connected with the beater and tail rake, and a separate and independent lever for controlling the operation and speed of the apron. In the use of such devices an inexperienced operator becoming confused will actuate the wrong lever, with the result that the beater is thrown out of operation and the apron is allowed to remain in movement, thereby packing the material against the beater, causing a clogging of the machine or a breaking of some of the important parts. Or, on the other hand, the apron may be thrown into operation before the beater, and the material being forced against the beater and tail rake clogs the same; then, when the beater is thrown into gear, excessive strains impinge on the driving connections, which in many cases will result in breakage.

I have, accordingly, provided an arrangement whereby the beater will always be thrown into operation before the apron is started, thereby allowing the beater to attain its maximum speed before the material is thrust into its path; whereby the apron will always be thrown out of operation simultaneously, or before the beater is disconnected, and in which the independence of adjustment of the speed of the apron is in no way affected or impaired. My invention is applicable to standard types of manure spreaders, and may be readily and easily attached without relocating or changing any of the original parts of the machine.

One form which my invention may assume is exemplified in the following description and illustrated in the accompanying drawings, in which—

Figure 1 shows a side elevation of a well-known type of manure spreader having applied thereto my safety controlling mechanism;

Figs. 2, 3 and 4 are detail views in plan of a portion of my device;

Fig. 5 shows an end view of a portion of the controlling lever for the apron equipped with my device;

Fig. 6 is a fragmentary view in elevation of my safety device, with the lever shown in dotted lines;

Fig. 7 is a detail view in elevation of a portion of the manure spreader and controlling levers equipped with a device embodying my invention, the levers therein being shown in inoperative positions;

Fig. 8 is a view in plan of the same, with the levers shown in operative positions;

Fig. 9 shows a side elevation of the parts illustrated in Fig. 8; and

Fig. 10 shows the variable speed driving mechanism for the apron, with its parts in positions corresponding to those of Fig. 9.

In the drawings there is shown a manure spreader 10 provided with a beater 11, tail rake 12, and an apron 13. Driving mechanism 14 connects the rear ground wheels with the beater, and is controlled in its operation in a well-known manner by means of an oscillating cam 15 connected with a crank arm 16 on a rock shaft 17, the rock shaft in turn being connected with a front controlling lever 18 by means of a link 19. A link 20 connects the tail rake also with the rock shaft 17, and thereby the controlling lever 18 adjusts the positions of the beater driving mechanism and the tail rake in unison.

A disk gear 21, having concentric series of gear teeth, preferably three in number, formed on its face and spaced a considerable distance apart, is carried on the axle of the spreader and is jointly rotatable therewith. A shaft 22, carrying a sliding pinion 23 adapted to mesh with the gear teeth on the disk gear, connects the disk gear through a worm gear and endless screw connection 24 to the apron driving shaft 25. A lever 26, mounted forward of the spreader adjacent the driver's seat and having a link connection 27 with the sliding pinion 23, controls the speed and operative movements of the apron.

This lever 26 coacts with a plate 28 fixed on the body of the spreader, and having on its outer edge a series of notches $a$ and $b$. The lever is provided at its pivot point with a pressure spring 26¹ to allow for lateral movement thereof, and normally the lever is in position to engage with any of the notches $a$ and $b$ and be held yieldingly therein. The notches $a$ indicate the positions occupied by the lever 26 when the sliding pinion 23 is in engagement with one of the series of gear teeth on the disk 21, and therefore driving the apron. The notches marked $b$ indicate the positions occupied by the lever when the sliding pinion is in the space between the concentric series of gear teeth or beyond the periphery of the disk, and therefore the apron is neutral. The neutral notches $b$ are three in number to correspond with the two spaces between the gear rings and the space at the outer side thereof. The active notches $a$ are three in number, representing the three gear rings on the disk 21.

So much of the mechanism as has been described operates in the usual manner. That is to say, the operator moves the lever 18 forwardly to actuate the rock shaft 17, throw the beater driving mechanism into operative position, and raise the tail rake 12. A separate movement of the lever 26 one notch or space engages the sliding pinion with one of the gear rings on the disk 21 and sets the apron into operation. Further movement of the lever 26 may then be made at any time to increase or diminish the speed of the apron, moving the lever rearwardly to increase the speed and forwardly to diminish it.

To render the parts of the manure spreader operable in the desired order I have provided the following arrangement: Beneath the plate 28 a sliding cam 29 is arranged and carried upon depending studs or pins 30 secured to the member 28. Irregularly shaped slots 31 formed in the cam member receive the pins 30, and cause an in and out movement of the said cam when it is actuated back and forth. Cam lugs 32, preferably three in number, are formed on the outer edge of the cam member, and project into the path of the lever 26 when the cam member is at its outer limit of movement, being withdrawn to clear the path of the lever when the cam member is at its inner limit of movement. A depending lug 33 is formed on the sliding cam member, and has a slotted connection 34 with a link 35, which link is in turn pivoted to the lower end of the lever 18 coaxially with the link 19.

Assuming that the parts are in the position shown in Fig. 8 and it is desired to throw them into neutral or inoperative position, a forward movement is imparted to the lever 18 which causes a corresponding rearward movement of the lower end thereof. The beater driving mechanism is thereby disconnected, and the tail rake, through the actuation of the rock shaft 17, is permitted to drop to its lowest position. When these parts are rendered inoperative it is essential that the apron be thrown out of movement at the same or earlier time so that the material, should the spreader be not emptied entirely, will not pack against the beater and tail rake, and thereby cause breakage.

Therefore, with the connection between the levers 18 and 26, just described, a rearward movement of the lower end of the lever 18 at the proper time causes a similar but considerably shortened movement of the cam member 29, due to the slotted link connection 35 therewith. As the cam member slides rearwardly the irregular slots therein impart an outward movement thereto. This outward movement effects an engagement between the nearest lug 32 and the lever 26. In this connection it is called to attention that each of the lugs 32 in the forward position of the cam member occupies a position forward of a notch $a$, there being three such notches and three lugs equally spaced. As the cam lug engages the lever the course of the slots 31 takes a sharp turn, which forces the cam member almost directly outward, carrying with it the yieldingly movable lever 26 until the lever is disengaged from its notch. Thereupon the course of the slots causes a rearward and inward movement of the cam member, carrying the lever and permitting it to engage with the first notch rearward of its original position, which, it will be seen, is one of the notches $b$, and represents a neutral position of the apron driving mechanism.

When the operator desires to throw the parts back into working position he may move the lever 18, which will reëngage the beater driving mechanism and elevate the tail rake, and simultaneously shift the cam member forward. However, it will be noted that a forward movement of the cam member does not in any way disturb the neutral location of the lever 26, and to reëngage the apron driving mechanism a separate movement of the adjusting lever is necessary.

In order, however, that this separate movement of the lever 26 to reëngage the apron driving mechanism shall not be imparted while the beater and tail rake are in inactive positions, I have provided the following locking mechanism:

Carried upon the lever 26 is a loop member 36, having an inwardly extending notched lug 37 in position engaging the lower surface of the sliding plate 29, and provided with an upwardly extending intermediate portion 38 terminating in a loop 39 above the notched bar or plate 28. A block 40 is likewise carried on the lever 26 in sliding engagement with the upper surface of the notched plate 28, and an extensible coiled spring 41 is positioned between the loop 39 and block 40 on the inner side of the lever 26, said spring operating to maintain the lug 37 in close engagement with the under surface of the sliding plate 29 regardless of the angular position of the lever 26. Upon the sliding plate 29, at the lower outer edge thereof, are three downwardly extending hooks 42, each positioned substantially in line with the forward end of one of the cam lugs 32.

In operation, as the lever 26 is moved to neutral position through the agency of one of the cam lugs 32, the adjacent hook 42 will, upon the completed movement of the sliding plate 29, engage with a notch 43 formed in the forward edge of the inwardly extending lug 37, and thereby effectually prevent outward movement of the lever to disengage it from its position within the neutral notch. In order to release the lever from its locked position it will be necessary for the operator to move the main controlling lever 18 rearwardly, thereby causing a forward movement of the plate 29, whereupon the engaging hook 42 will be carried out of its locked position with the lug 37 and the apron controlling lever will be left free to be moved as desired. Thus it will be seen that when the beater driving mechanism is disengaged and the tail rake is in lowered position, the apron controlling lever will be locked against actuation, so that thereby an inexperienced operator cannot put the apron in operation when the other parts are stationary, as is possible in devices heretofore in use. Therefore, the chance of breakage and disarrangement of parts is greatly minimized.

While I have shown and described but a single form of my invention, it will be understood, nevertheless, that it is capable of other modifications, and therefore many changes and variations may be made in the several parts without departing from the spirit of my invention as disclosed in the appended claims.

What I claim as my invention, and desire to secure by Letters Patent, is:

1. In a manure spreader, an apron, a beater, a tail rake, driving mechanism for the beater, change-speed driving mechanism for the apron, a unitary one-way control for said beater driving mechanism and the tail rake, and means for locking the apron in inoperative position when the beater is inoperative, thereby preventing the operation of said apron when said beater is inoperative.

2. In a manure spreader, a driving source, a beater, an apron, a driving connection between said source and said beater, a separate driving connection between said source and said apron, controlling mechanism for said driving connections including a unitary control for throwing said driving mechanisms out of operation and a control for throwing said mechanisms individually into operation.

3. In a manure spreader, a driving source, a beater, an apron, a driving connection between said source and said beater, a separate driving connection between said source and said apron, controlling means including unitary means for throwing said driving connections out of operative position and including a lever individually movable for throwing said apron driving connection into operation.

4. In a manure spreader, a driving source, a beater, a driving connection between said source and said beater, a controlling device for the beater, an apron, a separate driving connection for said apron automatically disengageable by the throwing out movement of the beater control, means individually movable for adjusting the speed and reengaging said apron driving mechanism, and means for locking the apron driving mechanism in inoperative position when the beater is inoperative.

5. In a manure spreader, a beater, controlling means therefor, an apron, apron driving means, and a lever for controlling said apron driving means, said lever being movable about its fulcrum by the operation of said beater control to throw the apron driving mechanism out of operation.

6. In a manure spreader, a beater, controlling means therefor, an apron, apron driving means, a lever for controlling said apron driving means, said lever being capable of individual movement in a direction to adjust said driving means and jointly movable with the beater control to throw the apron driving means out of operating position, and means for locking the apron driving mechanism in inoperative position when the beater is inoperative, thereby preventing the operation of said apron when said beater is inoperative.

7. In a manure spreader, a beater controlling device, a variable speed apron driving device, a lever for controlling the apron driving device, and means operated by the beater controlling device for locking said lever in a neutral position.

8. In a manure spreader, a beater controlling device, a variable speed apron driving device, a lever for controlling said apron drive, and means operated by the beater control for moving said lever about its fulcrum to neutral position when the beater is thrown out.

9. In a manure spreader, a beater, a controlling device therefor, a variable speed apron driving device, means for adjusting said apron driving device, and means operated by the beater control for moving said adjusting device to neutral position and locking it therein when the beater is thrown out.

10. In a manure spreader, a beater control, variable speed apron driving mechanism, adjusting means for the apron drive individually movable to various speed and neutral positions, and means whereby said adjusting means is movable by the beater control to its neutral position and locked there.

11. In a manure spreader, a beater control, variable speed apron driving mechanism, adjusting means for the apron drive individually movable to various speed and neutral positions, and means operated by the beater control for moving said adjusting means to one or the other of its neutral positions and locking it therein.

12. In a manure spreader, a beater control, an adjustable apron control, a unitary control for throwing said beater and apron out of operation, and cam connecting means between the beater control and the apron control for preventing initial independent movement of the apron control.

13. In a manure spreader, a beater control, an adjustable apron control movable independently to various speed and neutral positions, and cam connecting means between the beater and apron control for moving the latter to any one of its neutral positions.

14. In a manure spreader, a beater control, an adjustable apron control movable individually to various speed and neutral positions, and connecting means between the beater and apron control for moving the latter to one of its neutral positions and locking the same in position therein.

In testimony whereof I affix my signature, in the presence of two witnesses.

ERNEST BASEMAN.

Witnesses:
MARY FAUNDY,
RICHARD BUTLER.